United States Patent
Park et al.

(10) Patent No.: US 10,805,308 B2
(45) Date of Patent: *Oct. 13, 2020

(54) JOINTLY DISCOVERING USER ROLES AND DATA CLUSTERS USING BOTH ACCESS AND SIDE INFORMATION

(71) Applicant: International Business Machines Corporation, Armonk, NY (US)

(72) Inventors: Youngja Park, Princeton, NJ (US); Taesung Lee, Ridgefield, CT (US); Ian M. Molloy, Chappaqua, NY (US); Suresh Chari, Scarsdale, NY (US); Benjamin J. Edwards, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 153 days.

This patent is subject to a terminal disclaimer.

(21) Appl. No.: 15/851,852

(22) Filed: Dec. 22, 2017

(65) Prior Publication Data

US 2019/0199731 A1     Jun. 27, 2019

(51) Int. Cl.
*H04L 9/30*         (2006.01)
*H04L 29/06*        (2006.01)
*G06F 16/28*        (2019.01)
*G06F 16/951*       (2019.01)

(52) U.S. Cl.
CPC .......... *H04L 63/105* (2013.01); *G06F 16/285* (2019.01); *G06F 16/288* (2019.01); *G06F 16/951* (2019.01); *H04L 63/102* (2013.01); *H04L 63/104* (2013.01); *H04L 63/20* (2013.01); *H04L 63/101* (2013.01)

(58) Field of Classification Search
CPC ... H04L 63/105; H04L 63/102; G06F 16/951; G06F 16/288; G06F 16/285
See application file for complete search history.

(56) References Cited

U.S. PATENT DOCUMENTS

| 7,185,192 | B1* | 2/2007 | Kahn | G06F 21/6218 707/999.003 |
|---|---|---|---|---|
| 8,983,877 | B2 | 3/2015 | Chari | |
| 10,296,520 | B1* | 5/2019 | Ganesh | G06F 16/285 |
| 2005/0138419 | A1* | 6/2005 | Gupta | G06F 21/6218 726/4 |
| 2014/0129268 | A1 | 5/2014 | B'Far | |
| 2015/0067845 | A1 | 3/2015 | Chari | |
| 2015/0317376 | A1 | 11/2015 | Bauer | |

(Continued)

OTHER PUBLICATIONS

Wei Xu, "Document Clustering Based on Non-negative Matrix Factorization", Jul. 28, 2003, pp. 1-7.*

(Continued)

*Primary Examiner* — Wasika Nipa
(74) *Attorney, Agent, or Firm* — David B. Woycechowsky

(57) ABSTRACT

Jointly discovering user roles and data clusters using both access and side information by performing the following operation: (i) representing a set of users as respective vectors in a user feature space; representing data as respective vectors in a data feature space; (ii) providing a user-data access matrix, in which each row represents a user's access over the data; and (iii) co-clustering the users and data using the user-data matrix to produce a set of co-clusters.

18 Claims, 7 Drawing Sheets

(56) References Cited

U.S. PATENT DOCUMENTS

2016/0226830 A1    8/2016   Steeves
2016/0364469 A1   12/2016   Long

OTHER PUBLICATIONS

Liu et al., "Semi-supervised Data Clustering with Coupled Non-negative Matrix Factorization: Sub-category Discovery of Noun Phrases in NELL's Knowledge", Carnegie Mellon University, downloaded from the Internet on Dec. 19, 2017, 19 pages.

Symeonidis et al., "Nearest-Biclusters Collaborative Filtering with Constant Values", O. Nasraoui et al. (Eds.): WebKDD 2006, LNAI 4811, pp. 36-55, 2007. c Springer-Verlag Berlin Heidelberg 2007.

\* cited by examiner

400

| File Name | File Size | File Type |
|---|---|---|
| F1 | 102 | CAD |
| F2 | 98 | CAD |
| F3 | 3 | CAD |
| F4 | 157 | Text Doc |
| F5 | 88 | Text Doc |
| F6 | 1 | Text Doc |
| F7 | 398 | Spreadsheet |
| F8 | 225 | Spreadsheet |
| F9 | 7 | Spreadsheet |

| Employee Name | Service Years | Position |
|---|---|---|
| Aretha | 12 | Manager |
| Becca | 15 | Manager |
| Charles | 1 | Manager |
| Duane | 9 | Engineer |
| Enid | 9 | Engineer |
| Fabian | 7 | Engineer |
| Gerald | 8 | Engineer |
| Hallie | 2 | Engineer |
| Ingrid | 1 | Engineer |

| Employee Name | Service Years | Position | F1 | F2 | F3 | F4 | F5 | F6 | F7 | F8 | F9 |
|---|---|---|---|---|---|---|---|---|---|---|---|
| Aretha | 12 | Manager | 0 | 2 | 0 | 11 | 13 | 0 | 55 | 66 | 0 |
| Becca | 15 | Manager | 0 | 0 | 0 | 21 | 9 | 1 | 28 | 102 | 0 |
| Charles | 1 | Manager | 2 | 4 | 57 | 1 | 0 | 58 | 1 | 0 | 88 |
| Duane | 9 | Engineer | 4 | 4 | 3 | 20 | 24 | 0 | 50 | 60 | 1 |
| Enid | 9 | Engineer | 67 | 82 | 4 | 2 | 0 | 0 | 0 | 0 | 0 |
| Fabian | 7 | Engineer | 81 | 66 | 0 | 0 | 0 | 0 | 0 | 0 | 0 |
| Gerald | 8 | Engineer | 49 | 49 | 0 | 2 | 0 | 0 | 0 | 0 | 0 |
| Hallie | 2 | Engineer | 2 | 0 | 39 | 0 | 1 | 0 | 0 | 0 | 52 |
| Ingrid | 1 | Engineer | 2 | 0 | 75 | 0 | 0 | 3 | 0 | 0 | 26 |

| Employee / File Cluster | Employees | Files |
|---|---|---|
| I | Aretha, Becca, Duane | F4, F5, F7, F8 |
| II | Enid, Fabian, Gerald | F1, F2 |
| III | Charles, Hallie, Ingrid | F3, F6, F9 |

FIG. 4D $$\min f(W_U, W_A, W_D, H_1, H_2, H_3) = \frac{\lambda_1}{2} \|U - W_U H_1\|_F^2 + \frac{1}{2} \|A - W_A H_2\|_F^2 + \frac{\lambda_2}{2} \|D - W_D H_3\|_F^2$$

(1)

JOINTLY DISCOVERING USER ROLES AND DATA CLUSTERS USING BOTH ACCESS AND SIDE INFORMATION

BACKGROUND

The present invention relates generally to the field of security of data files, and more particularly to security of data files in an organization that assigns different users to different roles.

It is known to perform data mining in order to try to determine a user's role (for example, employment position in a company). Data mining access control permissions to generate a set of roles is known.

Co-clustering (also sometimes herein referred to as bi-clustering) is a known mathematical technique where: (i) two, or more, different types of "vectors" are provided, where each of the vectors are characterized by multiple values respectively representing different dimensions of a vector (for example, a vector corresponding to a person may include the dimensions of age, height, eye color and city of residence); and (ii) co-clusters are made to group like data together, where each co-cluster includes vectors from all of the different vector types being co-clustered. This co-clustering considers similarities and differences from multiple dimensions in making its co-clustering determinations. Some known co-clustering techniques are iterative, such that there is an initial determination of co-clusters which are then refined in subsequent passes of a co-clustering algorithm. Typically, co-clustering is a way to cluster a single matrix where both the rows and columns are clustered, so that both dimensions are clustered.

SUMMARY

According to an aspect of the present invention, there is a method, computer system and/or computer program product for performing the following operations (not necessarily in the following order): (i) receiving a file user data set including a plurality of user records respectively corresponding to a plurality of users, with each given user record including a plurality of user attribute values corresponding to attributes of the given user; (ii) receiving a file attribute data set including a plurality of file attribute records respectively corresponding to a plurality of files, with each given file attribute record including a plurality of file attribute values corresponding to attributes of the given file; (iii) receiving a file access data set including information indicative of access by each user, of the plurality of users, of each file of the plurality of files; and (iv) performing co-clustering, by machine logic, to define a plurality of user/file co-clusters, with each user/file co-cluster including at least one user and at least one file, and with the co-clustering being based on at least of the following: (a) at least one of the user attribute values of each of the users, (b) at least one of the file attribute values of each of the files, and (c) the file access data set.

BRIEF DESCRIPTION OF THE DRAWINGS

FIG. 4A is a table of two dimension file vectors for use in an example of processing by the first embodiment system;

FIG. 4B is a table of two dimensional employee vectors for use in an example of processing by the first embodiment system;

FIG. 4C is a table of multi-dimension vectors, combining employee vectors and file usage by the employees, for use in an example of processing by the first embodiment system;

FIG. 4D is a table of co-clusters, using the data of the tables of FIGS. 4A and 4B generated by the first embodiment system;

DETAILED DESCRIPTION

Figure 1:
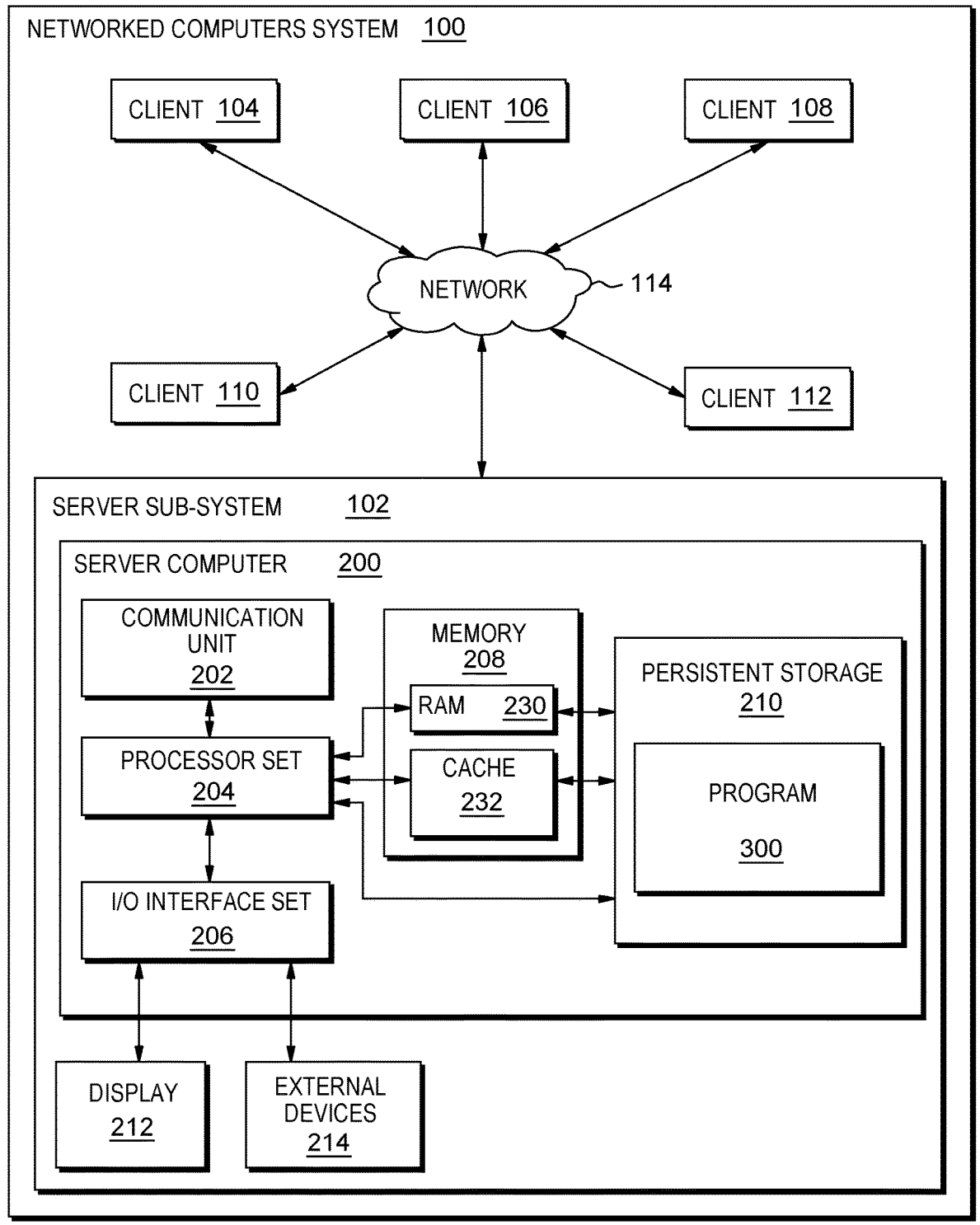
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
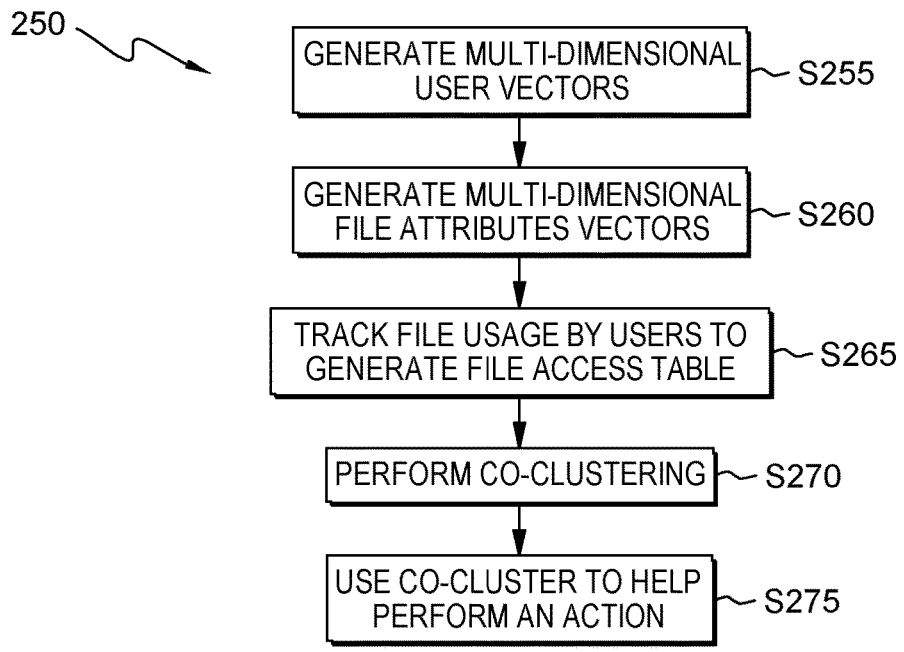
FIG. 2 is a flowchart showing a first embodiment method performed, at least in part, by the first embodiment system.
Figure 3:
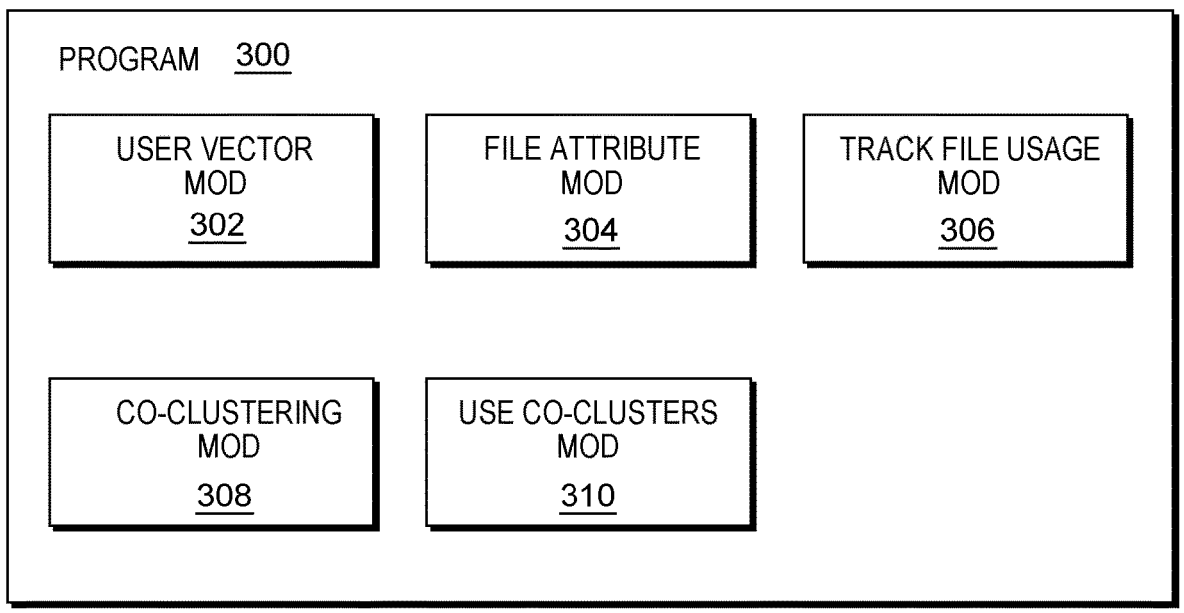
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where user vector module 302 (also sometimes referred to as a "user vector extraction module") generates vectors for users of a set of files. In this highly simplified example, the users are employees of a company with nine employees as shown in table 402 of FIG. 4B. The key values in this table are the employee's names (see leftmost column in table 402). Each user vector has two dimensions that will be considered in the co-clustering of the method of flowchart 250, specifically: (i) service years (see center column in table 402); and (ii) employee's employment position with the company (see table 402 at rightmost column). As will be readily appreciated by those of skill in the art, many embodiments of the present invention will have values for many more dimensions for each user vector.

Processing proceeds to operation S260, where file attribute module 304 (also sometimes herein referred to as a "file attribute extraction module") generates vectors for the files in a set of files. In this highly simplified example, the company has only nine (9) files, as shown in table 400 of FIG. 4A. The key values in this table are the file's names (F1 to F9 in this simple example, see leftmost column in table 400). Each file vector has two dimensions that will be considered in the co-clustering of the method of flowchart 250, specifically: (i) file size (see center column in table 400); and (ii) file type (see table 402 at rightmost column). As will be readily appreciated by those of skill in the art, many embodiments of the present invention will have values for many more dimensions for each file vector.

Processing proceeds to operation S265, where track file usage module 306 (also sometimes herein referred to as a "track file usage extraction module") tracks the number of times each of the nine (9) employees accesses each of the nine (9) files, and stores this information in table 404 of FIG. 4C. In this example, file access by each employee is tracked continuously from the original creation of each file F1 to F9 to a time that the method of flowchart 250 is performed. Alternatively, a more limited time window may be used such that only relatively recent file accesses are considered. While flowchart 250 shows operations S255, S260 and S265 happening in serial order in order to help fundamental understanding, it should be noted that, in most embodiments, these three operations would occur in an intermittent and temporally overlapping basis as: (i) employees and files are added and deleted; (ii) employee parameter values (like number of service years) change; (iii) file attribute values (like file size) change; and (iv) number of file accesses by the various employees changes (typically, these numbers would increase).

While this embodiment measures user file access solely in terms of the number of occasions upon which a given employee has accessed a given file, additionally or alternatively, other measures of user access could be used such as: (i) read access only; (ii) write access only; (iii) only accesses that exceed some threshold time; (iv) amount of data read from, or written to the file; and/or (v) number of separate days upon which a given employee accessed a given file. As will be explained, below, in the following sub-section of this Detailed Description section, some embodiments of the present invention may use an "access matrix" in place of, or in addition to, table 404 of FIG. 4C. An "access matrix" is an Employee×File matrix, with counts of access as each entry. In an access matrix, the rows should be individual employees, just like the columns are files. An access matrix would not typically include columns for "Service Years" and "Position." The labels for rows and columns in an access matrix may use employee names and/or other unique identifiers as key value(s) for the employees.

Processing proceeds to operation S270, where co-clustering module 308 performs co-clustering of employees and files based on the information of tables 400, 402, 404. Various possible co-clustering algorithms for use with the present invention will be discussed in detail in the next sub-section of this Detailed Description section. At this juncture in the descriptions, it will be noted that the co-clustering module performs co-clustering based upon all of the following: (i) multiple file user dimension values (also sometimes referred to herein as attribute values, table field values or vector field values)—specifically, in this example, values for service years and employee position; (ii) multiple file attribute values—specifically, in this example, values for file size and file type; and (iii) user data access information. In this example, three co-clusters are generated (I, II and III) as shown in table 406 of FIG. 4D.

Processing proceeds to operation S275 where use co-clusters module 310 uses the co-clusters defined in table 406 to perform a consequential action. In this example, the consequential action relates to making machine logic based rules for automatically setting security levels for employees and/or files based upon their attributes. Further, the co-clusters can be used to identify users whose roles have significantly changed from previously measured roles.

III. Further Comments and/or Embodiments

Access control and data security have been studied independently in cybersecurity. In access control, to reduce the cost of provisioning entitlements to users, role-based access control has been proposed which assigns entitlements to a group of users with similar job roles, rather than to individual users on a user by user basis. Role-based access control simplifies access permission control, but discovering a set of roles in a large number of users can be difficult. Mining user roles is also important for user behavior monitoring and anomaly detection. There have been efforts to mine user roles based the user permissions. Users are often represented as a vector of permissions and roles which may be discovered by applying various clustering techniques such as K-means clustering, non-negative matrix factorization (NMF) and Latent Dirichlet Allocation (LDA).

Identifying sensitive data in an automated fashion is a critical step for data security. Manual classification of the entire data in an organization is typically not feasible. One can discover sensitive data using data content classification or clustering technologies. However, often, these content-based methods cannot be applied to highly sensitive and classified data. In this case, an alternative way would be to cluster the data based on their meta information such as the file type, size, location and user information. Again, each data object is represented as a vector in the feature space and a clustering algorithm is applied to discover the underlying structure of the data.

User role mining can benefit from knowing which data the users access, the attributes of those data, and different user properties. Each of these alone might be able to define user or data clusters. However, a more complete view of user roles and data clusters can be provided by using the following three types of inputs in concert: (i) identity of the data (for example, which files, or which records in a database) that the users access; (ii) the attributes of the data the users access; and (iii) the attributes of the users. Some embodiments of the present invention use a unified framework that can cluster both users and data simultaneously based not only on user attributes and data attributes but the user-data access information as well. This simultaneous clustering of users and data can take into account the relationships between users and data and produce a better performance in discovering the underlying structures of users and data.

Some embodiments are directed to methods for co-clustering (also known as bi-clustering) of users and data. Some embodiments include new co-clustering methods for users and data using both user-data access information and additional side information for users and data.

Figure 5:
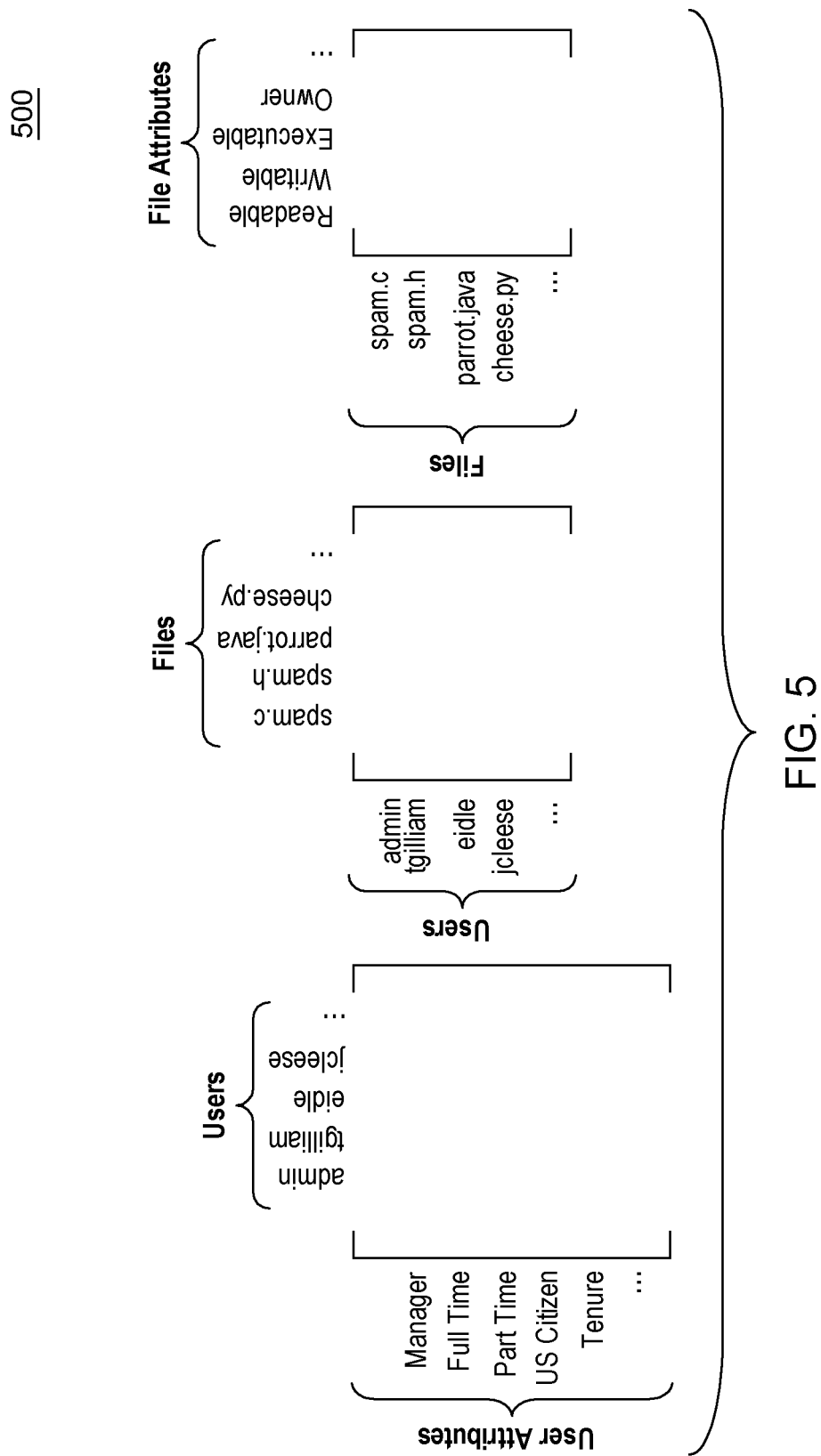
FIG. 5 is a diagram showing an example of user vectors, user-file usage vectors, and file vectors access helpful in understanding the present invention.

Some embodiments of the present invention may include one, or more, of the following features, characteristics and/or advantages: (i) users are represented as a vector in the user feature space (with various values associated with dimensions of each user vector, such as the department, if the user is a manager, a contractor, etc.); (ii) pieces of data (typically files) are represented as a vector in the data feature space (with various values associated with dimensions of each file vector, such as the authors, the file type, the size, the location of the file in a repository, etc.); (iii) generation of a user-data access matrix, in which each row represents a user's access over the data; and/or (iv) the value of each cell in the matrix can be binary, count or continuous. The overall data structures are shown in diagram 500 of FIG. 5.

According to various embodiments of the present invention, several different methods can be used to cluster users and data together simultaneously by incorporating both their own features and the access matrix which reveal additional interactions between users and data. In the following paragraphs, three representative co-clustering methods that takes the three types of information to achieve the goal will be discussed, but other embodiments of the present invention may use other methods.

Figure 6:
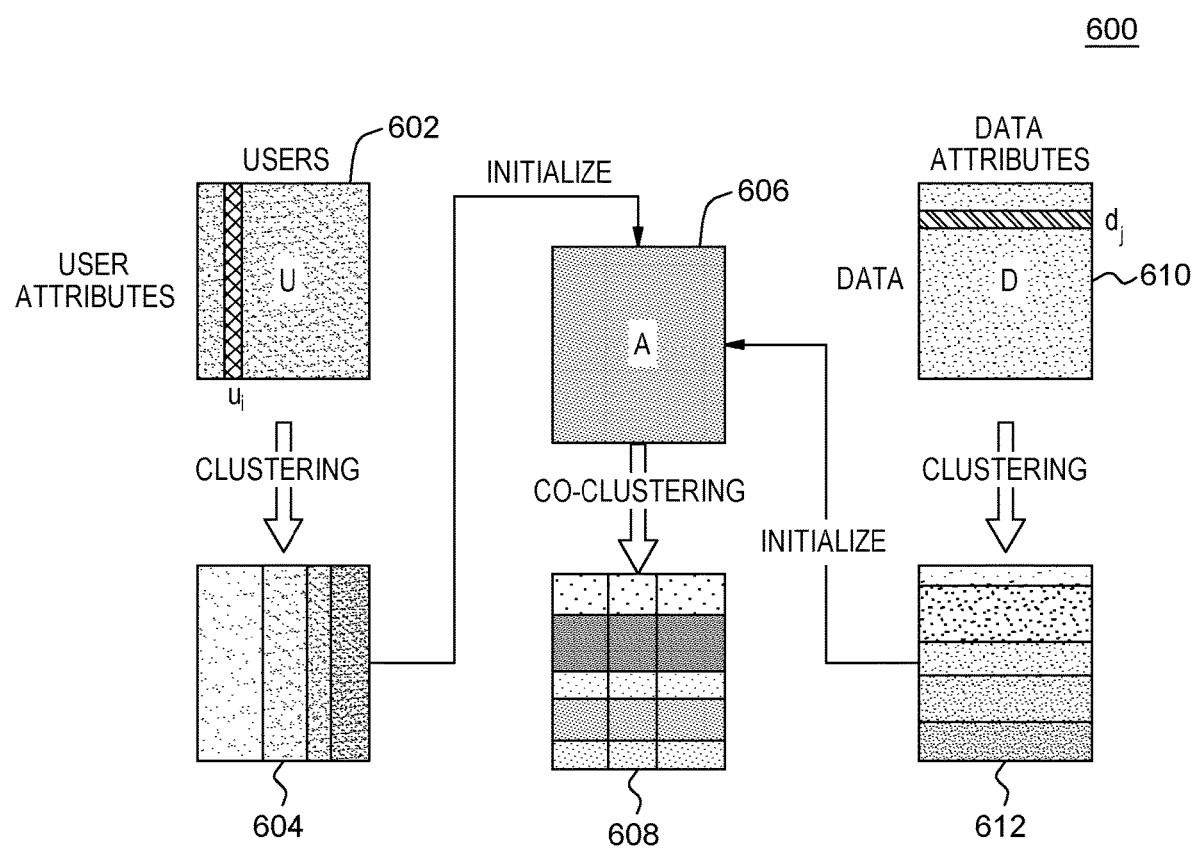
FIG. 6 is a block diagram showing a method according to the present invention.

FIRST CO-CLUSTERING METHOD: The first co-clustering method is a multi-view clustering shown by block diagram 600 of FIG. 6, which includes: user data set 602;

clustered user data set 604; access matrix 606; co-clustered user/data data set 608; data-attribute data set 610; and clustered data-attribute data set 612. Machine logic clusters data of the user data set 602 based solely on user related data to generate clustered user data set 604 (clustering in user-view). Machine logic clusters data of the data-attribute data set 610 based solely on data-attribute related data to generate clustered data-attribute data set 612 (clustering in data-view). Clustered user set 604 is made up of clusters of users. Clustered data-attribute data set 612 clusters of data. Access matrix 606 is initialized with the clusters of users 604 and the clusters of data 612. Then, machine logic performs a co-clustering of the users and data in access matrix 606 to generate co-clustered user/data data set 608. Instead of randomly initializing the cluster membership of users and data, this first co-clustering method initializes the cluster membership of users and data in access matrix 606 with the outcomes of the two clusterings. The co-clustering of users and data continues until it converges. The initialization using clustering based on the feature view will help the co-clustering converge faster and produce better clusters.

SECOND CO-CLUSTERING METHOD: The second co-clustering method is an extension of the first co-clustering method discussed above. The extension is that clustering in individual views and co-clustering are performed iteratively. The machine logic starts by co-clustering of users and data using the access matrix, and initializes the cluster membership of users and data using the intermediate co-clustering result. The machine logic then performs clustering of users and data separately based on their own features, and, when the clustering converges, the machine logic updates the co-clustering results with the clustering results. The machine logic then repeats the steps until there is no more change in the clusters.

THIRD CO-CLUSTERING METHOD: This method extends non-negative matrix factorization and uses a coupled matrix factorization method similar to the non-convex optimization that will be familiar to those of skill in the art from the following article: *Semi-supervised Data Clustering with Coupled Non-negative Matrix Factorization: Sub-category Discovery of Noun Phrases in NELLs Knowledge Base, Liu and Mitchell*, published at the Machine Learning Carnegie Mellon University website. However, because this method uses side information for both the user dimension and the data dimension, it obtains low-rank approximations of the user matrix, access matrix and data matrix. The process takes input parameters two low-ranks, K1 and K2, which are the number of clusters for users and for data. As shown in diagram 700 of FIG. 7, the factorization process performs a non-convex optimization over: (i) the user matrix 702×access matrix 704; and (ii) access matrix 704×data matrix 706.

Figures 7, 8:
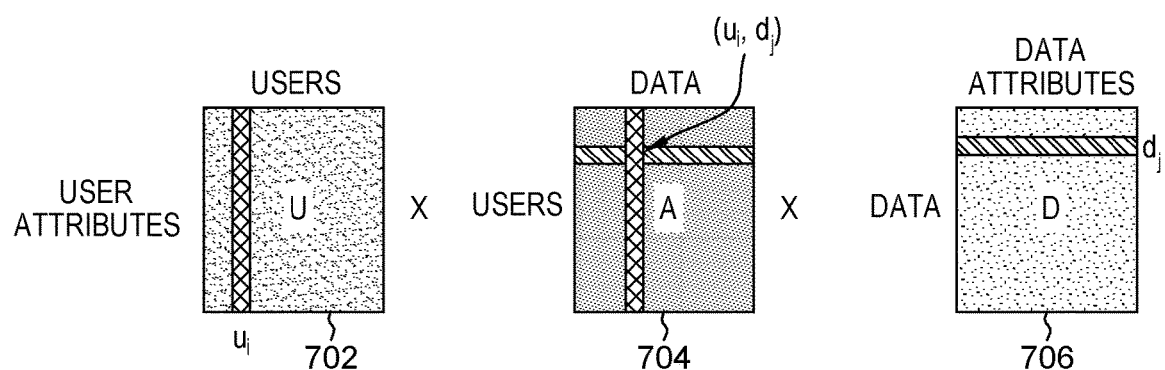
FIG. 7 is a block diagram showing another method according to the present invention.
FIG. 8 is an equation used in some embodiments of the present invention.

This joint non-negative matrix factorization can be expressed as equation (1) of FIG. 8. It represents the weighted error or loss on the reconstructions. So, that the variables W and H represent an approximation of matrix U, and they measure how much difference there is using the Frobenius norm. It's the quantity that is being minimized to find the low rank clustering. The equation consists of three terms each of which represents the decomposition of the matrices 702, 704, and 706. Setting $W_U=W_A$ and $H_2=H_3$, the decompositions are optimized to approximate the original matrices using lower rank matrices that essentially clusters rows and columns of the matrices considering all three types of the information.

According to an aspect of the present invention, there is a method for jointly discovering user roles and data clusters using both access and side information including the following operations (not necessarily in the following order): (i) representing a set of users as respective vectors in a user feature space; representing data as respective vectors in a data feature space; (ii) providing a user-data access matrix, in which each row represents a user's access over the data; and (iii) co-clustering the users and data using the user-data matrix to produce a set of clusters.

Some embodiments of the present invention may include one, or more, of the following features, characteristics and/or advantages: (i) the user features space is selected from a group consisting of a department of an organization, a user role and a user organization affiliation; (ii) the data features space is selected from group consisting of such as the authors, the file type, the size and the location of the file in a repository; and/or (iii) using the set of clusters to perform a data security function.

Some embodiments of the present invention may include one, or more, of the following features, characteristics and/or advantages: (i) goals/applications of user roles and data access control in a machine or a cluster; (ii) methods: nonnegative matrix decomposition, etc.; (iii) adopts an existing method for co-clustering, but includes an application to user access control and clustering files in terms of access levels; (iv) a computer system with multiple users and multiple files; (v) there are patterns that a certain group of users (for example, HR (human resources) department) access certain files so that if the groups are known and what what groups of files they normally access is known, then machine logic can do various things including: (a) building access control matrix stating that which user "can/cannot" access a certain file (for example, not anyone can access an HR document), and/or (b) find file access patterns and discover those access straying from regular usage, which can be an insider threat; (vi) multi-view clustering that applies clustering on each view and merge (and as explained in detail, above) using three matrices; and/or (vii) takes "side information" (that is the metadata/properties of data, and the attributes of users) as an input to a co-clustering operation. It should be understood that the side information can probably also be about the users. Both user attributes and file attributes are possible types of so-called side information.

Leveraging three matrices compared to one is very different. The machine logic can be programmed to use side information like the extension of a file, when it is created, who is the owner, which machine it resides in, the team a user is in, his or her job description, etc. In some embodiments, a major objective of the clustering is increased security (for example, security against an insider threat).

Some embodiments of the present invention may include one, or more, of the following features, characteristics, advantages and/or operations: (i) discovering groups of similar data files and groups of similar users (employees) in an organization to detect security of data files in an organization that assigns different users to different roles; (ii) generally recognizes anomalous behaviors; (iii) accessing specific files may not compromise the security of a particular file (it may be permissible for that user to access that file), but may be unusual for a user to do so; and (iv) perform data mining based on various data file attributes (for example, a source code file or a xml document) and user attributes in order to try to determine a user's role (for example, employment position in a company) and the access information of users to particular data files (for example, a user accesses many source code files) in order to try to determine a set of user's roles (for example, employment position in a company).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

User/subscriber: includes, but is not necessarily limited to, the following: (i) a single individual human; (ii) an artificial intelligence entity with sufficient intelligence to act as a user or subscriber; and/or (iii) a group of related users or subscribers.

What is claimed is:

1. A computer-implemented method comprising:
   receiving a file user vector data set including a plurality of user vectors respectively corresponding to a plurality of users, with each given user record including a plurality of user dimension values respectively corresponding to attributes of the given user;
   receiving a file vector data set including a plurality of file vectors respectively corresponding to a plurality of files, with each given file vector including a plurality of file dimension values respectively corresponding to attributes of the given file;
   receiving a file access data set including information indicative of access by each user, of the plurality of users, of each file of the plurality of files; and
   performing co-clustering, by machine logic, with the co-clustering including:
      selecting a plurality of vector types to be used in the co-clustering, with the plurality of vector types including at least the following vector types: (i) file user vector type having a plurality of user dimensions, and file vector type having a plurality of file dimensions, and
      making co-clustering determinations of a plurality of co-clustered vector clusters respectively including a plurality of vectors, with the making of the co-clustering determinations including consideration of similarities and differences from dimensions of a plurality of vectors of each vector type of the plurality of vector types, and with: (i) the file user vector type vectors including the plurality of user vectors of the file user vector data set, and (ii) the file vector type vectors including the plurality of file vectors of the file vector data set.

2. The method of claim 1 further comprising:
   performing, by machine logic, a security related action based, at least in part on the plurality of co-clustered vector clusters.

3. The method of claim 1 wherein the access indicated by the file access data set measures access according to at least one of the following types of measures of access: raw number of access operations by a given user, number of days a given file is accessed by a given user, data volume of write/delete operations by a given user to a given file, time of a day that a given file is accessed by a given user, and actions performed on a given file by a given user.

4. The method of claim 1 where file dimensions for each file correspond to at least one of the following types of file attributes: file name, department, title, division, groups and/or location creation date of file was created, file creator, number of total edits, file size, file extension, and/or file location.

5. The method of claim 1 where user dimensions for each user correspond to at least one of the following types of user attributes: number of years of service, user department, user division, user group, user title, user location, and/or full-time/part-time status.

6. The method of claim 1 wherein the performance of co-clustering includes:
   non-negative matrix factorization; and
   uses a coupled matrix factorization method.

7. A computer program product (CPP) comprising:
   a set of storage device(s) with each storage device including a set of storage medium(s); and
   computer code stored on the set of storage device(s), with the computer code including instructions and data for causing a processor(s) set to perform at least the following operations:
      receiving a file user vector data set including a plurality of user vectors respectively corresponding to a plurality of users, with each given user record including a plurality of user dimension values respectively corresponding to attributes of the given user,
      receiving a file vector data set including a plurality of file vectors respectively corresponding to a plurality of files, with each given file vector including a plurality of file dimension values respectively corresponding to attributes of the given file,
      receiving a file access data set including information indicative of access by each user, of the plurality of users, of each file of the plurality of files, and
      performing co-clustering, by machine logic, with the performance of co-clustering including:
         selecting a plurality of vector types to be used in the co-clustering, with the plurality of vector types including at least the following vector types: (i) file user vector type having a plurality of user dimensions, and file vector type having a plurality of file dimensions, and
         making co-clustering determinations of a plurality of co-clustered vector clusters respectively including a plurality of vectors, with the making of the co-clustering determinations including consideration of similarities and differences from dimensions of a plurality of vectors of each vector type of the plurality of vector types, and with: (i) the file user vector type vectors including the plurality of user vectors of the file user vector data set, and (ii) the file vector type vectors including the plurality of file vectors of the file vector data set.

8. The CPP of claim 7 wherein the computer code further includes instructions and data for causing the processor(s) set to perform the following operation(s):

performing, by machine logic, a security related action based, at least in part on the plurality of co-clustered vector clusters.

9. The CPP of claim 7 wherein the access indicated by the file access data set measures access according to at least one of the following types of measures of access: raw number of access operations by a given user, number of days a given file is accessed by a given user, data volume of write/delete operations by a given user to a given file, time of a day that a given file is accessed by a given user, and actions performed on a given file by a given user.

10. The CPP of claim 7 where file dimensions for each file correspond to at least one of the following types of file attributes: file name, department, title, division, groups and/or location creation date of file was created, file creator, number of total edits, file size, file extension, and/or file location.

11. The CPP of claim 7 where user dimensions for each user correspond to at least one of the following types of user attributes: number of years of service, user department, user division, user group, user title, user location, and/or full-time/part-time status.

12. The CPP of claim 7 wherein the performance of co-clustering includes:
  non-negative matrix factorization; and
  uses a coupled matrix factorization method.

13. A computer system (CS) comprising:
  a processor(s) set;
  a set of storage device(s) with each storage device including a set of storage medium(s); and
  computer code stored on the set of storage device(s), with the computer code including instructions and data for causing the processor(s) set to perform at least the following operations:
    receiving a file user vector data set including a plurality of user vectors respectively corresponding to a plurality of users, with each given user record including a plurality of user dimension values respectively corresponding to attributes of the given user,
    receiving a file vector data set including a plurality of file vectors respectively corresponding to a plurality of files, with each given file vector including a plurality of file dimension values respectively corresponding to attributes of the given file,
    receiving a file access data set including information indicative of access by each user, of the plurality of users, of each file of the plurality of files, and
    performing co-clustering, by machine logic, with the performance of co-clustering including:
      selecting a plurality of vector types to be used in the co-clustering, with the plurality of vector types including at least the following vector types: (i) file user vector type having a plurality of user dimensions, and file vector type having a plurality of file dimensions, and
      making co-clustering determinations of a plurality of co-clustered vector clusters respectively including a plurality of vectors, with the making of the co-clustering determinations including consideration of similarities and differences from dimensions of a plurality of vectors of each vector type of the plurality of vector types, and with: (i) the file user vector type vectors including the plurality of user vectors of the file user vector data set, and (ii) the file vector type vectors including the plurality of file vectors of the file vector data set.

14. The CS of claim 13 wherein the computer code further includes instructions and data for causing the processor(s) set to perform the following operation(s):

performing, by machine logic, a security related action based, at least in part on the plurality of co-clustered vector clusters.

15. The CS of claim 13 wherein the access indicated by the file access data set measures access according to at least one of the following types of measures of access: raw number of access operations by a given user, number of days a given file is accessed by a given user, data volume of write/delete operations by a given user to a given file, time of a day that a given file is accessed by a given user, and actions performed on a given file by a given user.

16. The CS of claim 13 where file dimensions for each file correspond to at least one of the following types of file attributes: file name, department, title, division, groups and/or location creation date of file was created, file creator, number of total edits, file size, file extension, and/or file location.

17. The CS of claim 13 where user dimensions for each user correspond to at least one of the following types of user attributes: number of years of service, user department, user division, user group, user title, user location, and/or full-time/part-time status.

18. The CS of claim 13 wherein the performance of co-clustering includes:
  non-negative matrix factorization; and
  uses a coupled matrix factorization method.

* * * * *